Aug. 16, 1966   R. P. ROHDE   3,266,381

CONTROL VALVE FOR VEHICLE CLOSURE OPERATOR SYSTEM

Filed Dec. 14, 1964

INVENTOR.
Robert P. Rohde
BY
W. S. Pettigrew
ATTORNEY

# United States Patent Office 3,266,381
Patented August 16, 1966

3,266,381
CONTROL VALVE FOR VEHICLE CLOSURE
OPERATOR SYSTEM
Robert P. Rohde, Saginaw, Mich., assignor to General Motors Corporation, Detroit, Mich., a corporation of Delaware
Filed Dec. 14, 1964, Ser. No. 418,227
4 Claims. (Cl. 91—420)

This invention relates generally to closure operator systems and more particularly to improved valving means for a vehicle body closure operator system.

One feature of this invention is that it provides a power operator system for moving a vehicle body closure between open and closed positions and including improved control valving means. Another feature of this invention is that it provides a vehicle body closure operator system including a fluid motor for moving the closure in either direction between open and closed positions, control valving means for selecting the direction of operation of the fluid motor, and instantaneous pressure relief means permitting the closure to be manually moved between its positions if desired without encountering a delay or resistance from the fluid power operating system. A further feature of this invention is that both the control and pressure relief functions are provided in a single small control valve of relatively simple and economical manufacture.

Figure 1:
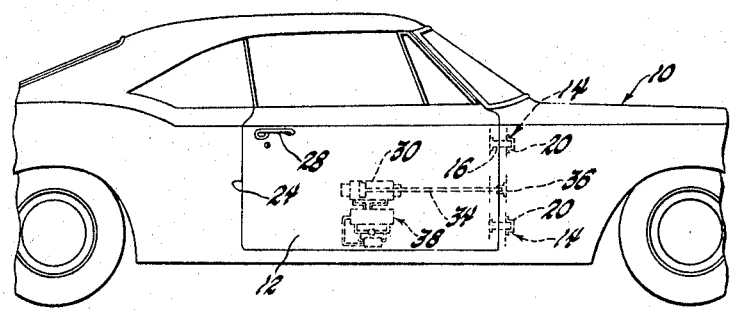
Figure 2:
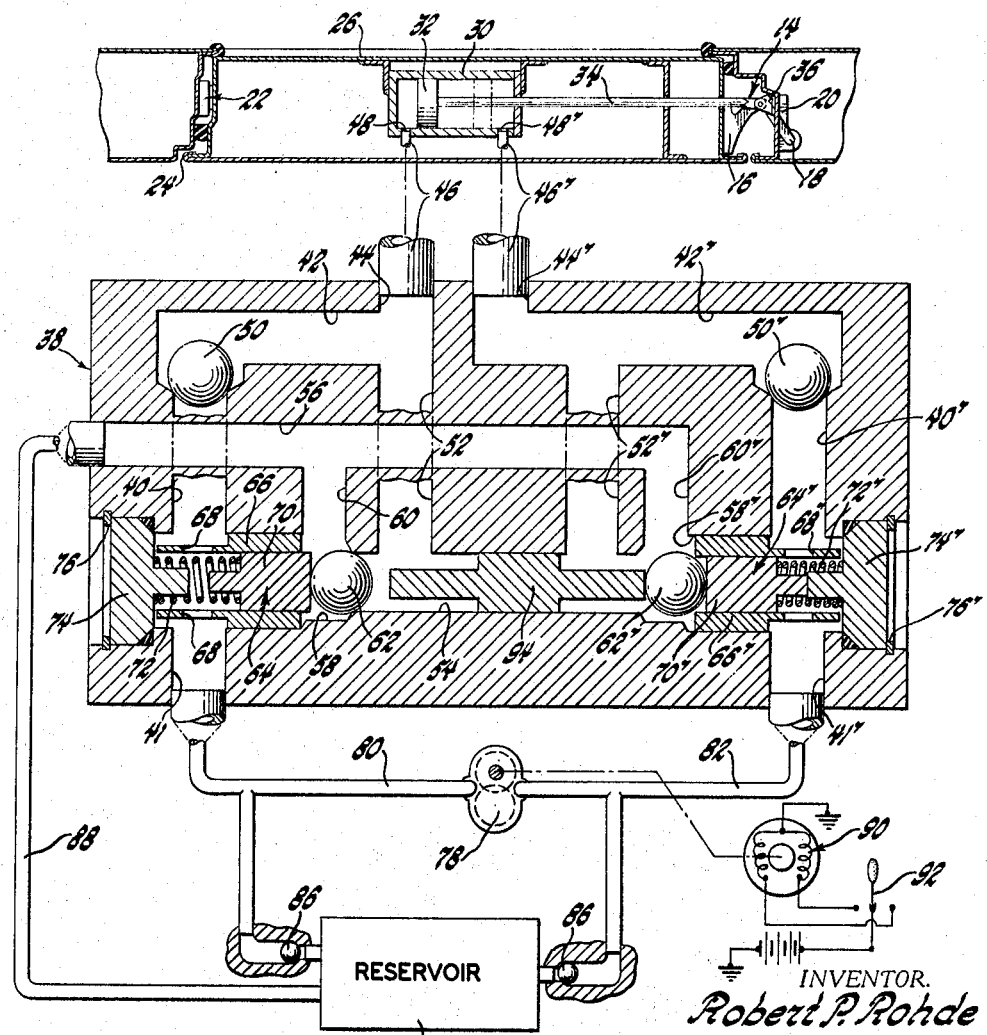

These and other features and advantages of the invention will be readily apparent from the following specification and drawings wherein:

FIGURE 1 is a fragmentary side elevational view of a vehicle body including a closure operator system according to this invention; and FIGURE 2 is a diagrammatic view, partially in horizontal section, and partially in an enlarged section of a portion of FIGURE 1.

Referring now particularly to FIGURE 1 of the drawings, a vehicle body 10 includes a door 12 swingably mounted adjacent its forward edge by a pair of vertically spaced hinge assemblies 14 for movement between a closed position as shown and an open position, not shown. As also seen in FIGURE 2, each hinge assembly 14 includes a first hinge strap 16 secured to a forward lateral jamb panel of door 12 and pivotally interconnected at 18 with a second hinge strap 20 secured on the inner side of a lateral jamb panel of body 10. A door latch indicated at 22 is mounted adjacent the rearward edge 24 of door 12 and is adapted to engage suitable striker means on the rearward jamb panel of body 10 to hold door 12 in closed position. As is conventional, door latch 22 may be manually operated in a well-known manner to release the door for movement to an open position either by suitable inside operating handle means on the inner side of door 12 or by an outside operating handle 28.

A power closure operator system according to this invention for moving door 12 between open and closed positions generally includes a fluid motor comprising a cylinder 30 suitably mounted by brackets on the inner panel 26 of door 12 and having reciprocably mounted therein a shafted piston 32, the shaft 34 of which extends forwardly through apertures in the lateral reinforcing and jamb panels of the door to be pivotally mounted at its free end on a mounting bracket 36 secured to the forward jamb panel of body 10. The pivotal interconnection between shaft 34 and bracket 36 is transversely spaced from the hinge axis 18 of each hinge assembly 14 so that the piston 32 may exert a force through a substantial moment arm about axes 18 to move the door between its positions.

A symmetrical combined control and relief valve 38 is provided to control the fluid motor in its door-opening and door-closing operations. Describing first the left-hand side of the symmetrical valve, a supply passage 40 extends from a supply port 41 upwardly to connect with a transverse passage 42 communicating with a port 44 connected by tubing 46 to one motor port 48 of cylinder 30. A check ball valve 50 is adapted to seat adjacent the junction of passages 40 and 42 under a pressure differential thereacross in favor of passage 42, and to unseat under a pressure differential in favor of passage 40. A second passage 52 connecting with transverse passage 42 extends downwardly to communicate with a longitudinally extending stepped diameter bore 54 extending throughout the length of valve 38. A longitudinally extending discharge passage 56 is connected with an enlarged diameter chamber portion 58 of bore 54 by a passage 60. A ball check valve 62 is adapted to seat adjacent the junction of passage 60 and bore 54 to close passage 52 from passage 60 and discharge passage 56 under conditions to be described hereinafter.

Received within an enlarged diameter portion of bore 54 is a pressure-differential responsive piston valve assembly 64 including a sleeve 66 receiving therein a piston 70 adapted to seat at one end thereof on check ball 62. Aligned bores 68 in sleeve 66 permit flow through passage 40. A coil compression spring 72 for biasing piston 70 to the right seats at one end on the piston and at its other end over an extension of a plug 74 retained within a further enlarged diameter portion of bore 54 by a snap ring 76.

As indicated above, the right-hand side of valve 38 is substantially identical to the left-hand side just described and includes supply and transverse passages 40' and 42', a port 44' from passage 42' connected by tubing 46' to a second motor port 48', a check ball valve 50' between passages 40' and 42', and another check ball valve 62' received within a chamber 58' and adapted to close a second passage 52' from a passage 60' connecting with discharge passage 56. A piston valve assembly 64' includes a sleeve 66' having bores 68', a piston 70' within the sleeve, and a spring 72' seating between the piston and a plug 74' retained by a snap ring 76'.

A reciprocable piston-plunger 94 in the middle portion of bore 54 is responsive to pressure differentials in passages 60 and 60' to unseat either check ball 62 or check ball 62' against the action of either spring 72 or 72' respectively.

A reversible gear pump 78 has one port thereof connected by tubing 80 to the port 41 of supply passage 40 and the other port thereof connected by tubing 82 to the port 41' of supply passage 40'. A sump 84 for the system fluid is connected in parallel with pump 78 and is provided with check ball valves 86 preventing direct circuit between the sump and the pump. Discharge tubing 88 connects the outlet port of discharge passage 56 with sump 84. A reversible electric motor 90 for driving pump 78 in a selected direction is connected across the electrical power supply of the vehicle by a double-throw switch 92 located as desired in the passenger compartment of body 10.

Although not specifically part of this invention, suitable remote unlatching means may be provided to release latch 22 in conjunction with the operation of the closure operator fluid motor, the unlatching means preferably being arranged to release the latch prior to energization of the fluid motor to avoid stress and wear in the motor and latch parts.

Assuming now that door 12 is initially in its closed position and that it is desired to move the door to an open position by means of the fluid motor, switch 92 is thrown to energize the motor 90 in a direction to cause pump 78 to draw from reservoir through tubing 82 and pressurize supply passage 40 through tubing 80. Check ball 50 is thus unseated to supply pressurized fluid to passage 52 and through tubing 46 to motor port 48, and check ball 50' is drawn seated to avoid vacuum in the passages thereabove. It will be observed that inasmuch as equal pressures obtain on the ends of valve piston 70, spring 72 is effective to seat check ball 62 to prevent discharge to reservoir from passage 52 through discharge 56. The left-hand chamber of motor cylinder 30 is thus charged to force piston 32 to the right therewithin and cause relative movement of door 12 about hinge axis 18 to a fully open position. The right-hand chamber of cylinder 30 may concurrently discharge through tubing 46' against the seated check ball 50', and consequently into passage 52'. Check ball 62' has concurrently been unseated by the movement of plunger 94 to the right against spring 72' under the differential pressure in favor of passage 52, and the right-hand chamber of cylinder 30 thus discharges to reservoir through passage 60' and discharge passage 56. Limit switches may be provided to automatically stop motor 90 and pump 78 once the door has reached fully open position.

When door 12 is in an open position, it may be power closed by throwing switch 92 in a direction to cause motor 90 to drive pump 78 in a direction pressurizing tubing 82 and supply passage 40'. Similar pressure conditions are experienced on the right side of the valve as those just described, check ball 62' being seated under the spring bias on valve piston 70' so that flow is delivered to motor port 48', and plunger 94 being pressure-forced to the left to unseat check ball 62 against the action of spring 72 and permit discharge from the left-hand chamber of cylinder 30 to reservoir.

Assuming now that door 12 is again in an open position and that it is desired to manually move the door to closed position, such manual movement of the door moves piston 32 to the left and free discharge from the left-hand chamber of cylinder 30 must immediately occur to prevent any delay or resistance to manual door movement. It will be seen that such discharge through tubing 46 pressurizes passages 42 and 52 to a substantial degree, the pressure in passage 42 serving to seat check ball 50. Supply passage 40 thus remains unpressurized. However, the pressure in passage 52 is effective to immediately unseat check ball 62 against the action of spring 70 to permit instantaneous discharge through passage 60 to discharge passage 56, and the door experiences unimpeded swinging movement to closed position. Concurrently, the pressure in passage 52 moves plunger 94 to the right to unseat check ball 62' and permit the right-hand chamber of cylinder 30 to draw from the reservoir and avoid a vacuum in the right-hand side of valve 38. It will be seen that check ball 50' may also unseat to allow such drawing from reservoir.

The conditions obtaining in valve 38 when door 12 is initially closed and it is manually moved to an open position are identical to those just described, the resultant discharge from the right-hand chamber of cylinder 30 seating check ball 50' and unseating check ball 62' against the action of spring 72' to permit immediate discharge to reservoir, and moving plunger 94 to the left to unseat check ball 62 to permit draw from reservoir to the left-hand chamber of cylinder 30.

Thus a new and improved vehicle closure operator system is provided.

I claim:

1. The combination comprising, a vehicle body having a closure movable between open and closed positions, a source of pressurized fluid, a sump, a fluid motor including a piston operable to move said closure between said positions thereof, first passage means for supplying fluid under pressure from said source to one side of said motor to move said closure from one of said positions thereof to the other position thereof, second passage means connecting said one side of said motor to said sump, third passage means connecting the other side of said motor to said sump, a valve responsive to pressurization in said first passage means for selectively and alternately closing said second passage means when said first passage means is pressurized from said source or opening said second passage means when said first passage means is not pressurized from said source, and means in said first passage means intermediate said one side of said motor and said valve for trapping pressurized fluid remote from said valve to permit rapid opening of said second passage means upon movement of said closure from said other to said one position thereof independently of fluid supply to said motor from said source.

2. The combination comprising, a vehicle body having a closure movable between open and closed positions, a source of pressurized fluid, a sump, a fluid motor including a piston operable to move said closure between said positions thereof, first passage means for supplying fluid under pressure from said source to one side of said motor to move said closure from one of said positions thereof to the other position thereof, second passage means connecting said one side of said motor to said sump, third passage means connecting the other side of said motor to said sump, a shiftable valve responsive to a pressure differential between said first and said second passage means, said valve being selectively and alternately operable to open and close said second passage means to and from said sump, and means in said first passage means intermediate said one side of said motor and said valve for trapping pressurized fluid remote from said valve to permit rapid opening of said second passage means upon movement of said closure from said other to said one position thereof independently of fluid supply to said motor from said source.

3. The combination comprising, a vehicle body having a closure movable between open and closed positions, a source of pressurized fluid, a sump, a fluid motor including a motor piston operable to move said closure between said positions thereof, first passage means for supplying fluid under pressure from said source to one side of said motor to move said closure from one of said positions thereof to the other position thereof, second passage means connecting said one side of said motor to said sump, third passage means connecting the other side of said motor to said sump, a valve piston responsive to a pressure differential between said first and second passage means to selectively and alternately open and close said second passage means to and from said sump, means biasing said valve piston in a direction to normally close said second passage means, and means in said first passage means intermediate said one side of said motor and said valve piston for trapping pressurized fluid remote from said valve piston upon movement of said closure from said other to said one position thereof, movement of said closure from said other to said one position thereof independently of fluid supply to said motor chamber creating a pressure differential across said valve piston against the bias thereon to cause rapid opening of said second passage means and discharge from said one side of said motor to said sump.

4. The combination comprising, a vehicle body having a closure movable between open and closed positions, a source of pressurized fluid, a sump, a fluid motor including a piston operable to move said closure between said positions thereof, first passage means for supplying fluid under pressure from said source to one side of said motor to move said closure from one of said positions thereof to the other position thereof, second passage means connecting said one side of said motor to said sump, third passage means connecting the other side of said motor to said sump, first valve means normally closing said third passage means, shiftable valve means responsive to a pressure differential in said first and second passage means, said shiftable valve means being selectively and alternately operable to close said second passage means and open said first valve means when said first passage means is pressurized from said source or to open said second passage means when said first passage means is not pressurized from said source, and means in said first passage means intermediate said one side of said motor and said shiftable valve means for trapping pressurized fluid remote from said shiftable valve means to permit rapid opening of said second passage means upon movement of said closure from said other to said one position thereof independently of fluid supply to said motor from said source.

References Cited by the Examiner

UNITED STATES PATENTS 2,362,339 11/1944 Armington _____ 91—420 X

FOREIGN PATENTS 116,799 6/1961 Russia.

MARK NEWMAN, *Primary Examiner.*

P. T. COBRIN, *Assistant Examiner.*